(12) United States Patent
Wen et al.

(10) Patent No.: US 11,042,037 B2
(45) Date of Patent: Jun. 22, 2021

(54) EARPHONE AND HEAD-MOUNTED DISPLAY

(71) Applicant: Acer Incorporated, New Taipei (TW)

(72) Inventors: Chun-Hung Wen, New Taipei (TW); Chun-Hsien Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/430,435

(22) Filed: Jun. 4, 2019

(65) Prior Publication Data

US 2020/0264439 A1 Aug. 20, 2020

(30) Foreign Application Priority Data

Feb. 20, 2019 (TW) ................................. 108105654

(51) Int. Cl.
| | |
|---|---|
| *H04R 1/10* | (2006.01) |
| *G02B 27/01* | (2006.01) |
| *G06F 1/16* | (2006.01) |
| *H04R 5/02* | (2006.01) |

(52) U.S. Cl.
CPC ......... *G02B 27/0176* (2013.01); *G06F 1/163* (2013.01); *H04R 1/1008* (2013.01); *H04R 1/1075* (2013.01); *H04R 5/02* (2013.01)

(58) Field of Classification Search
CPC .. G02B 27/0176; G02B 27/01; G02B 27/017; H04R 1/1075; H04R 1/1008; H04R 5/02; H04R 5/0335; H04R 5/033; H04R 1/10; H04R 1/1041; H04R 2430/01; G06F 1/163; G06F 3/02; G06F 3/0202
See application file for complete search history.

(56) References Cited

U.S. PATENT DOCUMENTS

| | | | | |
|---|---|---|---|---|
| 4,066,849 | A | * | 1/1978 | Chladil, Sr. .......... H04R 1/1041 381/371 |
| 5,729,605 | A | * | 3/1998 | Bobisuthi ............ H04R 1/1041 379/430 |
| 2011/0211709 | A1 | * | 9/2011 | Szolga ................. H04R 1/1041 381/74 |
| 2014/0133670 | A1 | * | 5/2014 | Lee ...................... H04R 5/0335 381/74 |
| 2017/0126869 | A1 | * | 5/2017 | Digioia ................... H04M 1/05 |

FOREIGN PATENT DOCUMENTS

| | | |
|---|---|---|
| CN | 203931697 | 11/2014 |
| CN | 103369422 | 9/2016 |
| TW | 201419883 | 5/2014 |

* cited by examiner

*Primary Examiner* — Adam R. Giesy
(74) *Attorney, Agent, or Firm* — JCIPRNET

(57) ABSTRACT

An earphone including a base, a cover, a rotating plate, a speaker, a displacement transducer and a follower is provided. The cover is disposed on the base. The rotating plate is rotatably disposed between the base and the cover. The speaker is disposed between the base and the cover. The displacement transducer is fixed to the base and located between the base and the cover. The rotating plate is coupled to the follower, and the follower is coupled to displacement transducer. A head-mounted display is further provided.

12 Claims, 5 Drawing Sheets

EARPHONE AND HEAD-MOUNTED DISPLAY

CROSS-REFERENCE TO RELATED APPLICATION

This application claims the priority benefit of Taiwan patent application Ser. No. 108105654, filed on Feb. 20, 2019. The entirety of the above-mentioned patent application is hereby incorporated by reference herein and made a part of this specification.

BACKGROUND

Technical Field

The disclosure relates to an earphone and a display, and particularly relates to an earphone and a head-mounted display.

Description of Related Art

Virtual Reality (VR) integrates techniques such as computer graphics, computer simulation, artificial intelligence, sensing, display, network parallel processing, etc., to create a three-dimensional (3D) virtual scene through a computer, allowing users to immerse themselves in the 3D virtual scene to obtain an immersive sensory experience.

Head-mounted display is the most commonly used VR device at present, and a user needs to wear it on the head and make a display screen close to the eye, so that an image of the 3D virtual scene is directly presented in front of the eye, and the user may get a better sense of presence in the process of VR experience. On the other hand, in order to avoid the user being disturbed by external sound and enhance their sense of hearing immersion, earphones integrated to the head-mounted displays are developed. In the process of VR experience, if the user wants to adjust a volume output by the earphone, a volume adjustment mechanism of the earphone must be designed more intuitively and to be easily operated to avoid destroying or interrupting the user's VR experience.

SUMMARY

The disclosure is directed to an earphone and a head-mounted display having excellent operational convenience.

An embodiment of the disclosure provides an earphone including a base, a cover, a rotating plate, a speaker, a displacement transducer and a follower. The cover is disposed on the base. The rotating plate is rotatably disposed between the base and the cover. The speaker is disposed between the base and the cover. The displacement transducer is fixed to the base and located between the base and the cover. The rotating plate is coupled to the follower, and the follower is coupled to the displacement transducer.

An embodiment of the disclosure provides a head-mounted display including a bracket, a display and the aforementioned earphone. The display and the earphone are respectively connected to the bracket.

Based on the above description, the earphone of the disclosure is configured with the displacement transducer, a user is capable of rotating the rotating plate to drive the follower, so as to adjust a resistance of the displacement transducer through the follower. As such, a magnitude of a volume output by the speaker can be controlled through the variation of the resistance of the displacement transducer. Therefore, the design of the volume adjustment mechanism adopted by the earphone of the disclosure is very intuitive, which is easy for the user to operate. On the other hand, the head-mounted display of the disclosure is integrated with the aforementioned earphone.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
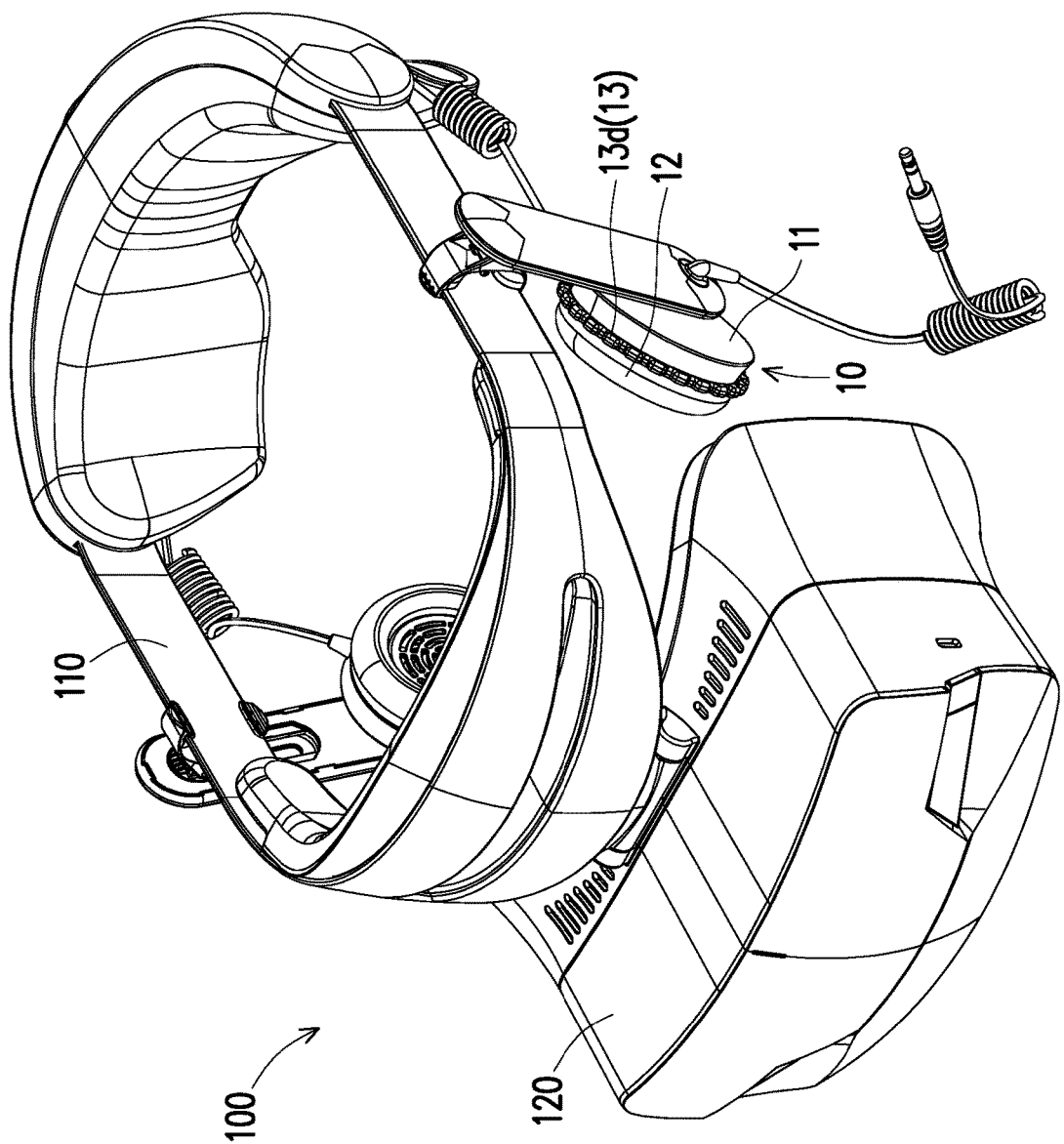
FIG. 1 is a schematic diagram of a head-mounted display according to an embodiment of the disclosure.
Figure 2:
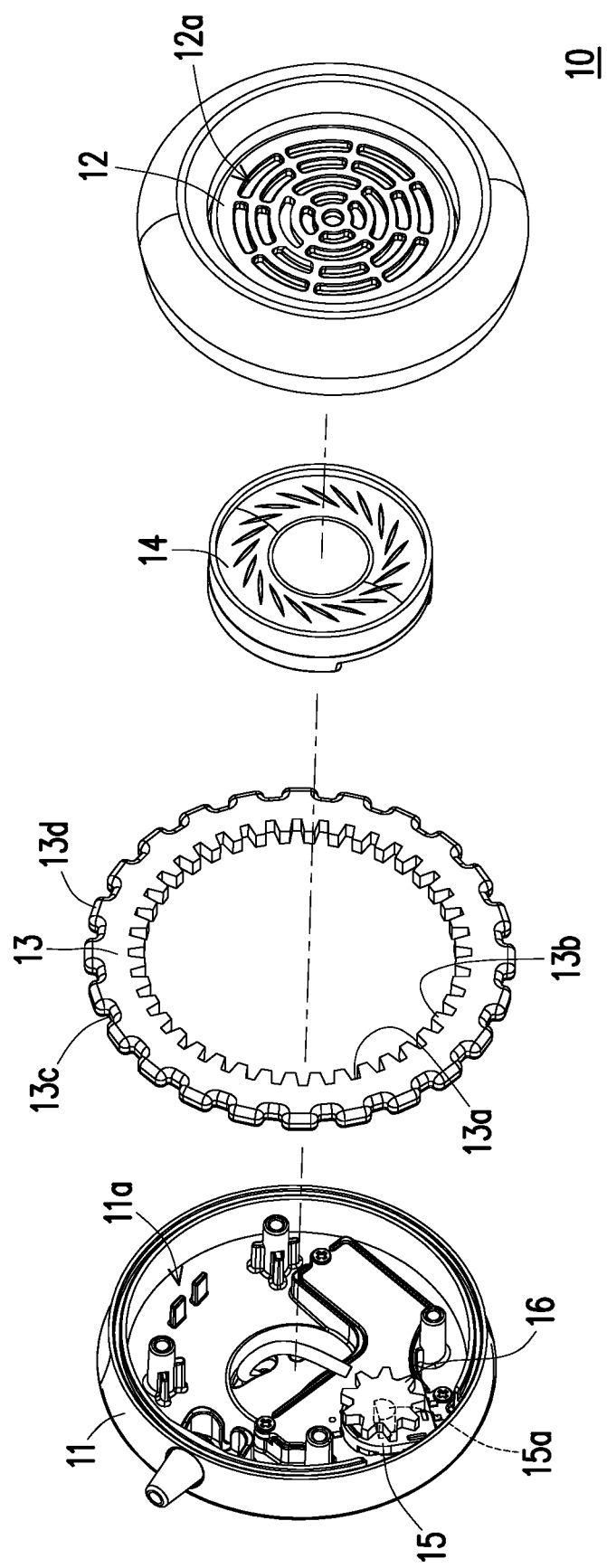
FIG. 2 is an exploded view of an earphone according to an embodiment of the disclosure.
Figure 3:
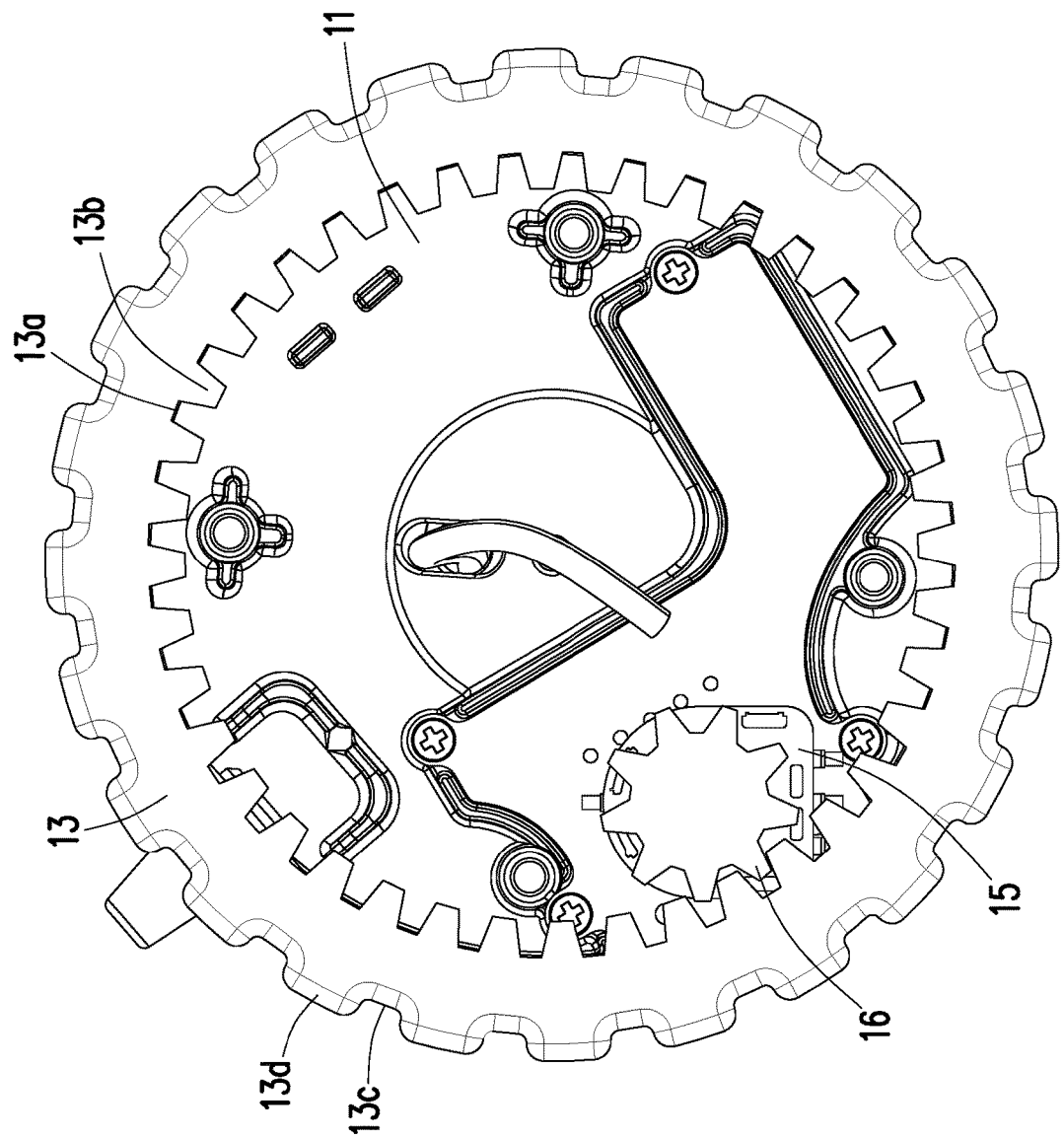
FIG. 3 is a schematic diagram of the earphone according to an embodiment of the disclosure.

FIG. 1 is a schematic diagram of a head-mounted display according to an embodiment of the disclosure. FIG. 2 is an exploded view of an earphone according to an embodiment of the disclosure. FIG. 3 is a schematic diagram of the earphone according to an embodiment of the disclosure. Particularly, in order to clearly illustrate an internal structure of the earphone 10, a cover 12 and a speaker 14 are omitted in FIG. 3. Referring to FIG. 1 to FIG. 3, in the embodiment, the head-mounted display 100 includes a bracket 110, a display 120 and an earphone 10, wherein the display 120 and the earphone 10 are respectively connected to the bracket 110. For example, the earphone 10 may be an earmuff earphone, and may be disassembled from the bracket 110.

The earphone includes a base 11, a cover 12, a rotating plate 13, a speaker 14, a displacement transducer 15 and a follower 16, wherein the base 11 is connected to the bracket 110 through a connection rack, and the base 11 has an accommodating groove 11a for accommodating the speaker 14 and the displacement transducer 15. The cover 12 is disposed on the base 11, and is configured with sound holes 12a for the sound output by the speaker 14 to pass through. The rotating plate 13 is disposed between the base 11 and the cover 12. Further, the rotating plate 13 is clamped between the base 11 and the cover 12, but still retains a degree of freedom of rotation with respect to the base 11 and the outer cover 12, which is a rotation around a specific axial direction. For example, a guide structure may be provided at a position where the rotating plate 13 contacts the base 11 to ensure that the rotating plate 13 rotates around the specific axial direction, alternatively, the guide structure may be provided at a position where the rotating plate 13 contacts the cover 12 to ensure that the rotating plate 13 rotates around the specific axial direction, alternatively, guide structures are provided at the position where the rotating plate 13 contacts the base 11 and the position where the rotating plate 13 contacts the cover 12 to ensure that the rotating plate 13 rotates around the specific axial direction.

The speaker 14 and the displacement transducer 15 are all fixed to the accommodating groove of the base 11, and the cover 12 covers the accommodating groove 11a. Namely, the speaker 14 and the displacement transducer 15 are disposed between the base 11 and the cover 12. In the embodiment, the follower 16 is a follower gear, and is coupled to the displacement transducer 15. The displacement transducer 15 may be implemented by a potentiometer, and is coupled to the follower 16, wherein the displacement transducer 15 includes a knob, and the follower 16 is sleeved on the knob 15a. Further, the rotating plate 13 is a ring-shape structure, wherein an inner ring 13a of the rotating plate 13 falls on top of the accommodating groove IIa, and the inner ring 13a is configured with an inner gear 13b. The follower 16 is surrounded by the inner ring 13a of the rotating plate 13, and is engaged with the inner gear 13b. On the other hand, the rotating plate 13 has an outer ring 13c (or referred to as outer wall) opposite to the inner ring 13a, wherein the outer ring 13c (or referred to as the outer wall) is exposed between the base 11 and the cover 12, and the outer ring 13c (or referred to as the outer wall) is configured with protrusions 13d to facilitate the user to exert a force on the rotating plate 13 to rotate the rotating plate 13 relative to the base 11 and the cover 12.

During the process that the rotating plate 13 is rotated relative to the base 11 and the cover 12, the inner gear 13b of the rotating plate 13 drives the follower 16 to rotate, and the knob 15a of the displacement transducer 15 is synchronously rotated along with the follower 16, wherein a rotation direction of the follower 16 is the same with a rotation direction of the inner gear 13b of the rotating plate 13. The potentiometer (i.e. the displacement transducer 15) includes two fixed contacts and a slide contact located between the two fixed contacts, and by rotating the knob 15a to drive the slide contact to slide between the two fixed contacts, the resistance of the potentiometer (i.e. the displacement transducer 15) is adjusted, and a magnitude of a volume output by the speaker 14 is controlled through the variation of the resistance of the potentiometer (i.e. the displacement transducer 15).

Therefore, when the user wears the head-mounted display 100 to experience virtual reality, since an operation mechanism of the earphone 10 for adjusting the volume is quite intuitive, the user can easily control the magnitude of the volume output by the earphone 10 by rotating the rotating plate 13, which is extremely convenient in operation.

Figure 4:
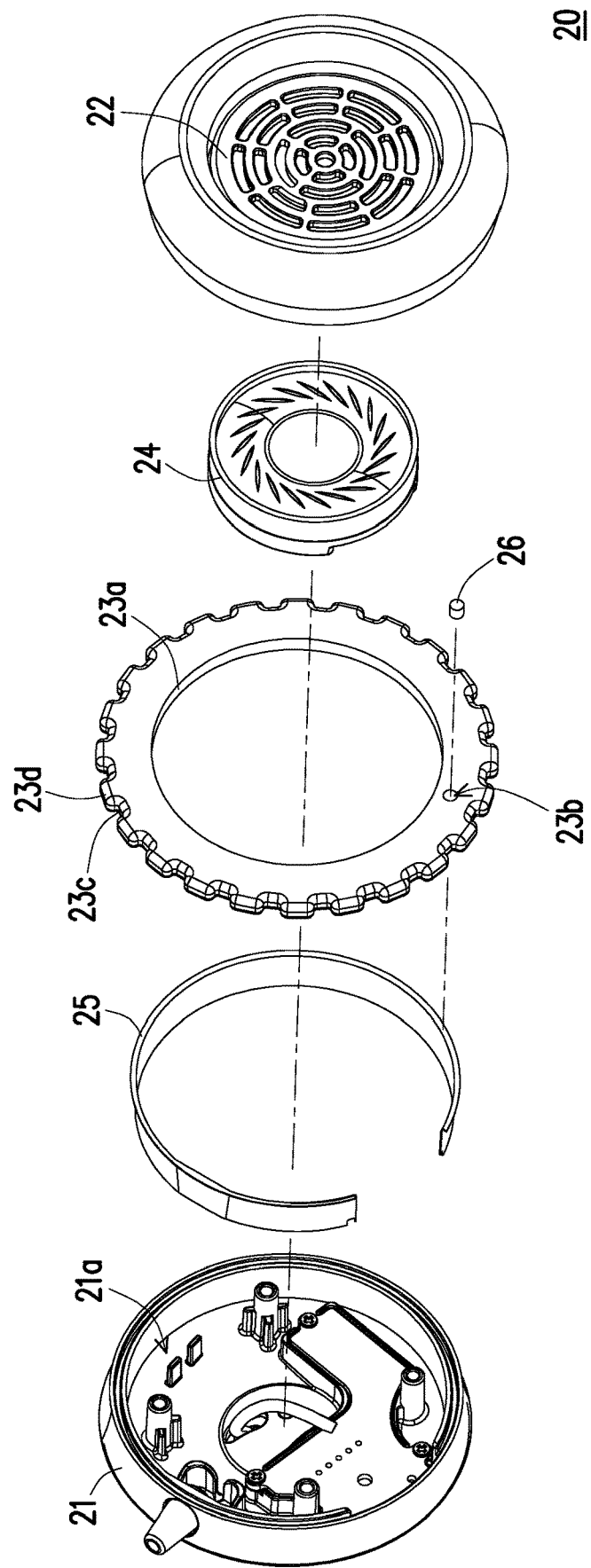
FIG. 4 is an exploded view of an earphone according to another embodiment of the disclosure.
Figure 5:
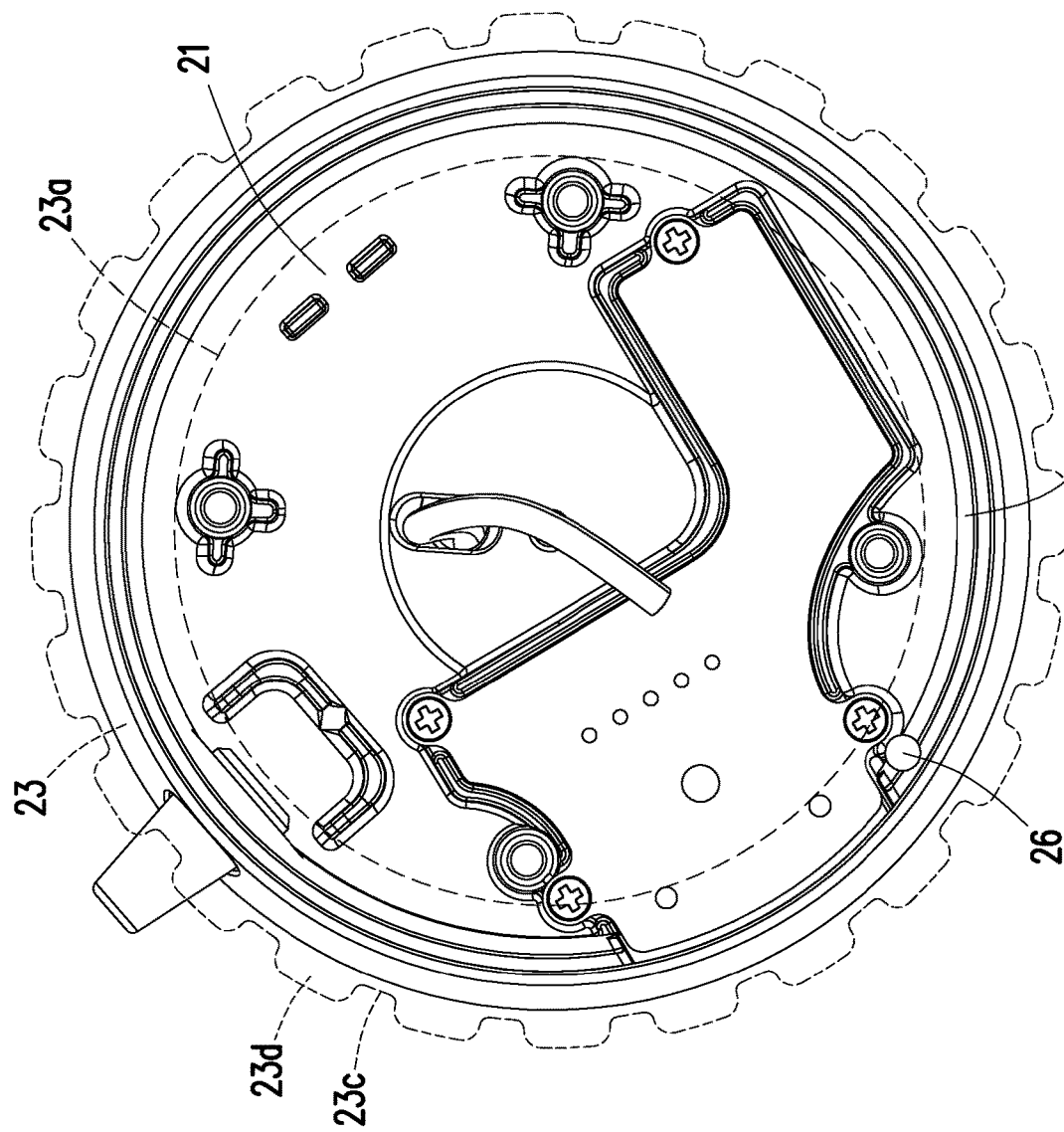
FIG. 5 is a schematic diagram of the earphone according to another embodiment of the disclosure.

FIG. 4 is an exploded view of an earphone according to another embodiment of the disclosure. FIG. 5 is a schematic diagram of the earphone according to another embodiment of the disclosure. Particularly, in order to clearly illustrate an internal structure of the earphone 20, a cover 22 and a speaker 24 are omitted in FIG. 5, and a rotating plate 23 is illustrated in dash lines. Referring to FIG. 4 and FIG. 5, the earphone 20 of the embodiment may be applied to the head-mounted display 100 of the aforementioned embodiment, and structural designs of the earphone 20 of the embodiment and the earphone 10 of the aforementioned embodiment are substantially the same, and only differences between the earphone 20 of the embodiment and the earphone 10 of the aforementioned embodiment are described below.

The earphone 20 includes a base 21, a cover 22, a rotating plate 23, a speaker 24, a displacement transducer 25 and a follower 26, and the design and the configuration of these components of the earphone 20 are substantially the same with that of the earphone 10 of the aforementioned embodiment, and a difference there between is that in the embodiment, the displacement transducer 25 may be implemented by a resistance ruler with a C-shape structure. The displacement transducer 25 is fixed in the accommodating groove 21a of the base 21, so that it does not slide easily under an external force. The rotating plate 23 has a ring-shape structure, wherein the rotating plate 23 has a mounting portion 23b between an inner ring 23a and an outer ring 23c (or referred to as an outer wall), and the outer ring 23c (or referred to as the outer wall) is configured with protrusions 23d to facilitate the user to exert a force on the rotating plate 23 to rotate the rotating plate 23 relative to the base 21 and the cover 22.

The mounting portion 23b of the rotating plate 23 is used for mounting and fixing the follower 26 to the rotating plate 23, wherein the mounting portion 23b is disposed corresponding to the resistance ruler (i.e. the displacement transducer 25) to ensure that the follower 26 fixed to the mounting portion 23b is in contact with the resistance ruler (i.e. the displacement transducer 25). For example, the mounting portion 23b of the rotating plate 23 may be a mounting hole or a mounting groove for the follower 26 to be inserted therein, or the mounting portion 23b is provided with a positioning structure that cooperates with the follower 26 to make the follower 26 firmly mounted to the rotating plate 23.

Further, the rotating plate 23 is disposed right above the resistance ruler (i.e. the displacement transducer 25), or an orthogonal projection of the rotating plate 23 on the base 21 is overlapped with an orthogonal projection of the resistance ruler (i.e. the displacement transducer 25) on the base 21, wherein the mounting portion 23b and the follower 26 are aligned with a side edge of the resistance ruler (i.e. the displacement transducer 25), and the follower 26 contacts the side edge of the resistance ruler (i.e. the displacement transducer 25). On the other hand, the follower 26 may be a conductor, and during the process that the rotating plate 23 is rotated relative to the base 21 and the cover 22, the follower 26 is synchronously rotated along with rotating plate 13 to slide between two stroke end points of the resistance ruler (i.e. the displacement transducer 25), so as to adjust the resistance of the resistance ruler (i.e. the displacement transducer 25), and a magnitude of a volume output by the speaker 24 is controlled through the variation of the resistance of the resistance ruler (i.e. the displacement transducer 25). On the other hand, in order to improve smoothness of the follower 26 sliding on the resistance ruler (i.e. the displacement transducer 25), the follower 26 may have a margin of elastic deformation, or may be implemented by a pogo pin.

In summary, the earphone of the disclosure is configured with the displacement transducer, which may be implemented by a potentiometer or a resistance ruler, the user is capable of rotating the rotating plate to drive the follower, so as to adjust the resistance of the displacement transducer through the follower. As such, a magnitude of a volume output by the speaker can be controlled through the variation of the resistance of the displacement transducer. Therefore, the design of the volume adjustment mechanism adopted by the earphone of the disclosure is very intuitive, which is easy for the user to operate. On the other hand, the head-mounted display of the disclosure is integrated with the aforementioned earphone.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An earphone, comprising:
   a base, wherein the base has an accommodating groove;
   a cover, disposed on the base;
   a rotating plate, rotatably disposed between the base and the cover, wherein all an outer ring of the rotating plate is outside the accommodating groove;
   a speaker, disposed between the base and the cover;
   a displacement transducer, fixed to the base, and located between the base and the cover; and
   a follower, wherein the rotating plate is coupled to the follower, and the follower is coupled to the displacement transducer,
   wherein an inner ring of the rotating plate surrounds the speaker.

2. The earphone as claimed in claim 1, wherein the rotating plate is a ring-shape structure, and the inner ring of the rotating plate is configured with an inner gear, and the follower is a driven gear used for engaging with the inner gear of the rotating plate.

3. The earphone as claimed in claim 2, wherein the displacement transducer is a potentiometer, and comprises a knob, and the follower is sleeved on the knob.

4. The earphone as claimed in claim 1, wherein the rotating plate has a mounting portion disposed corresponding to the displacement transducer, the follower is mounted to the mounting portion of the rotating plate, and the follower is a conductor used for contacting the displacement transducer.

5. The earphone as claimed in claim 4, wherein the displacement transducer is a resistance ruler with a C-shape structure.

6. The earphone as claimed in claim 1, wherein an outer wall of the rotating plate is exposed between the base and the cover, and the outer wall is configured with protrusions.

7. A head-mounted display, comprising:
   a bracket;
   a display, connected to the bracket; and
   an earphone, connected to the bracket, and comprising:
      a base, wherein the base has an accommodating groove;
      a cover, disposed on the base;
      a rotating plate, rotatably disposed between the base and the cover, wherein all an outer ring of the rotating plate is outside the accommodating groove;
      a speaker, disposed between the base and the cover;
      a displacement transducer, fixed to the base, and located between the base and the cover; and
      a follower, wherein the rotating plate is coupled to the follower, and the follower is coupled to the displacement transducer,
      wherein an inner ring of the rotating plate surrounds the speaker.

8. The head-mounted display as claimed in claim 7, wherein the rotating plate is a ring-shape structure, and the inner ring of the rotating plate is configured with an inner gear, and the follower is a driven gear used for engaging with the inner gear of the rotating plate.

9. The head-mounted display as claimed in claim 8, wherein the displacement transducer is a potentiometer, and comprises a knob, and the follower is sleeved on the knob.

10. The head-mounted display as claimed in claim 7, wherein the rotating plate has a mounting portion disposed corresponding to the displacement transducer, the follower is mounted to the mounting portion of the rotating plate, and the follower is a conductor used for contacting the displacement transducer.

11. The head-mounted display as claimed in claim 10, wherein the displacement transducer is a resistance ruler with a C-shape structure.

12. The head-mounted display as claimed in claim 7, wherein an outer wall of the rotating plate is exposed between the base and the cover, and the outer wall is configured with protrusions.

* * * * *